(12) United States Patent
Rumpf

(10) Patent No.: US 7,714,696 B2
(45) Date of Patent: May 11, 2010

(54) APPARATUS FOR PROVIDING DRIVE-OFF SECURITY IN A MOTOR VEHICLE ENVIRONMENT AND A MOTOR VEHICLE BEING PROVIDED WITH SUCH APPARATUS

(75) Inventor: Bernd Rumpf, Nidderau-Windecken (DE)

(73) Assignee: Siemens Aktiengesellschaft, Munich (DE)

( * ) Notice: Subject to any disclaimer, the term of this patent is extended or adjusted under 35 U.S.C. 154(b) by 693 days.

(21) Appl. No.: 10/511,417

(22) PCT Filed: Mar. 19, 2003

(86) PCT No.: PCT/EP03/02886

§ 371 (c)(1), (2), (4) Date: May 23, 2005

(87) PCT Pub. No.: WO03/093076

PCT Pub. Date: Nov. 13, 2003

(65) Prior Publication Data

US 2005/0270174 A1 Dec. 8, 2005

(30) Foreign Application Priority Data

Apr. 30, 2002 (EP) .................. 02009797

(51) Int. Cl.
*B60R 25/00* (2006.01)
(52) U.S. Cl. ............... 340/5.31; 340/426.11; 307/10.2; 180/287
(58) Field of Classification Search ........... 340/5.31, 340/870.16, 426.1, 426.11, 426.12; 307/10.2, 307/10.4, 10.5; 180/287; 701/36; 123/179.4
See application file for complete search history.

(56) References Cited

U.S. PATENT DOCUMENTS

| | | | | |
|---|---|---|---|---|
| 4,892,167 | A | * | 1/1990 | Tejeda .................. 180/287 |
| 4,991,683 | A | * | 2/1991 | Garretto et al. ........... 180/287 |
| 5,172,094 | A | * | 12/1992 | Stadler ................ 340/426.11 |
| 5,193,641 | A | * | 3/1993 | Durrell .................. 180/287 |
| 5,486,806 | A | | 1/1996 | Firari |
| 5,494,130 | A | | 2/1996 | Foster |
| 5,513,244 | A | * | 4/1996 | Joao et al. ............... 455/404.1 |
| 5,598,898 | A | * | 2/1997 | Mutoh et al. ............. 180/287 |
| 5,600,723 | A | * | 2/1997 | Woodall et al. ........... 713/170 |
| 5,703,414 | A | | 12/1997 | Mutoh et al. |

(Continued)

FOREIGN PATENT DOCUMENTS

EP 0 753 437 A 1/1997

(Continued)

OTHER PUBLICATIONS

English Translation of Chinese Second Office Action, Jun. 15, 2007, 6 sheets.

(Continued)

*Primary Examiner*—Edwin C Holloway, III
(74) *Attorney, Agent, or Firm*—Cohen Pontani Lieberman & Pavane LLP

(57) ABSTRACT

An apparatus is arranged for providing drive-off security in a motor vehicle environment through blocking one or more vehicle engine system sub-functions, such blocking is triggered by detecting an unauthorized system activation. A particular such sub-function facility comprises an on-off control circuit is used to control the functionality of a fuel pump arrangement.

13 Claims, 3 Drawing Sheets

U.S. PATENT DOCUMENTS 5,839,081 A * 11/1998 Joao et al. .................... 701/36
6,144,112 A    11/2000 Gilmore
6,206,130 B1    3/2001 Hetler
6,481,404 B1 * 11/2002 Perry et al. .............. 123/179.3

FOREIGN PATENT DOCUMENTS

| | | |
|---|---|---|
| FR | 2 705 631 A | 12/1994 |
| JP | 09132116 A | 5/1997 |
| JP | 10081202 A | 3/1998 |
| JP | 2000-25570 | 1/2000 |
| WO | WO 89 07815 A | 8/1989 |

OTHER PUBLICATIONS

Translation of Official Letter Regarding Japanese References, dated Jul. 17, 2007, 2 pages.

* cited by examiner

APPARATUS FOR PROVIDING DRIVE-OFF SECURITY IN A MOTOR VEHICLE ENVIRONMENT AND A MOTOR VEHICLE BEING PROVIDED WITH SUCH APPARATUS

BACKGROUND OF THE INVENTION

1. Field of the Invention

The invention relates to an apparatus arranged for providing drive-off prevention security in a motor vehicle environment through blocking one or more vehicle engine system subfunctions, such blocking being triggered by a detection of an unauthorized system activation.

2. Background of the Related Art

Motor vehicle theft, joyriding and various other categories of unauthorized motor vehicle appropriation have become an ever increasing risk, especially in view of the growing sophistication of the offenders. Key-and-lock arrangements for vehicle doors, ignition control key systems, and various other measures have been developed, using both mechanical and electronic means, but most of such security arrangements have in fact been located at the physical perimeter of the vehicle, so that they could be circumvented by measures like brute force, or by short-circuiting or replacing a part that provided the inhibit function by another part that did not.

SUMMARY OF THE INVENTION

The present inventor has recognized that the inhibit element should as it were be placed in the heart of the vehicle where physical access to such element should require an unfeasible amount of effort, and that the combination of the fuel pump and fuel tank of the motor vehicle would offer an advantageous basis for locating such inhibit element.

In consequence, amongst other things, it is an object of the present invention to allow the drive-off prevention security be attained through an on-off control circuit pertaining to and controlling a fuel pump arrangement functionality means of the vehicle.

Now therefore, according to one of its aspects the invention is characterized in that a particular said sub-function facility comprises an on-off control circuit pertaining to and controlling a fuel pump arrangement functionality means.

According to a particularly advantageous aspect, operativity activation of the fuel pump arrangement requires a pre-established code word from a drive-off security electronic circuit. Further advantageous aspects of the present invention have been recited in dependent Claims.

Now, U.S. Pat. No. 5,019,812 to Göstahagberg, et al., describes an electronic locking system especially suited for a motor vehicle, wherein selective presetting of a particular lock to match with a particular key is effected. However, the reference does not contemplate to inhibit the operativity of the protected vehicle through blocking the operation of the fuel pump, but only considers the personalization between key and lock. The effectivity of the reference as teaching a drive-off prevention security against forceful, shrewd or cognizant offenders would be minimal.

BRIEF DESCRIPTION OF THE DRAWINGS

These and further aspects and advantages of the invention will be discussed more in detail hereinafter with reference to the disclosure of preferred embodiments, and in particular with reference to the appended Figures that show.

DETAILED DESCRIPTION OF THE DRAWINGS

Figure 1:
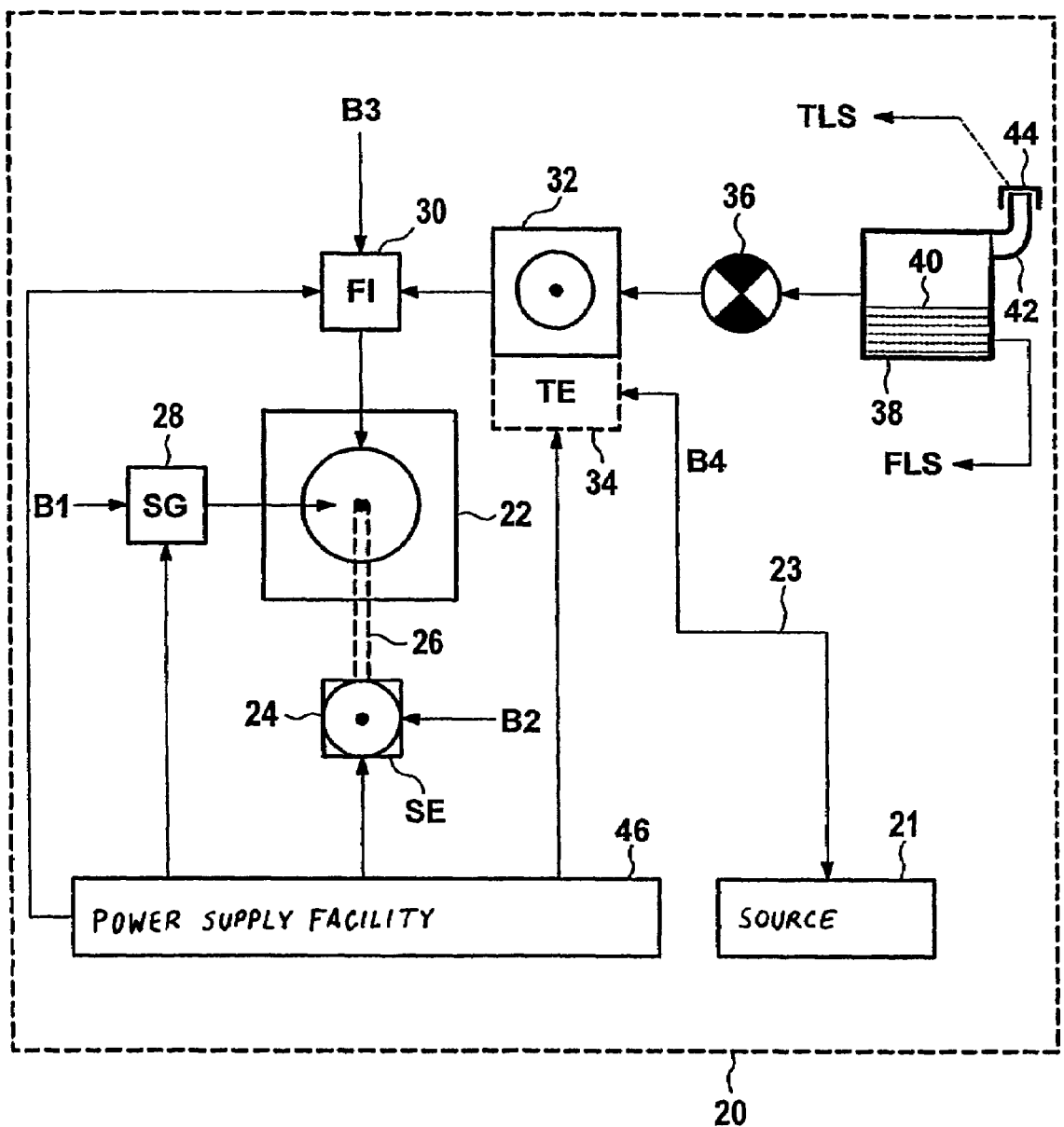
FIG. 1, an overall sketch of a motor vehicle arranged according to the present invention.

FIG. 1 illustrates an overall sketch of a motor vehicle embodiment being arranged according to the present invention. The motor vehicle itself has been succinctly indicated only by broken line rectangle 20. The rotary engine 22 is drivable by start engine 24 through drive mechanism 26 that has been drawn in broken lines, signalling that the driving by the start engine is only temporary. The specific type of the engine, the number of cylinders, and the mode of operation are not restrictive to the present invention, further than the liquid or gaseous character of the fuel. Standard gasoline, propane or other gas type propulsion, fuel injection, diesel, Wankel, and various other types of engines would be applicable. Spark generation S.G. mechanism 28 provides for adequate ignition of the fuel-air mixture inside engine 22. Fuel injection mechanism F.I. 30 provides for supplying an adequate amount of fuel as regarding the various operational conditions of engine 22. Fuel pump 32 provides fuel to the injection mechanism 30. By way of example, valve 36 has been interposed between fuel tank 38 and fuel pump 32. Fuel tank 38 contains fuel with free surface level 40, and lid 44.

Tank electronics 34 are physically joined with fuel pump 32 to a subassembly. A currently preferred embodiment is that the tank electronics are near the flange of the pump, or even integrated therewith to constitute a single part or subassembly. Given the small size of the electronics in question, the space necessary therefor would cause no appreciable problem. In particular with reference to motor vehicles, the fuel tank and/or fuel pump facilities used in the present embodiment have been difficult to physically access in most models, in particular, because they have been away from the vehicle's physical perimeter. Power supply facility 46 provides adequate electric power to various ones of the subsystems 24, 28, 30, and 32/34, which may be pertain both to standard electric voltages and also to dynamic or cyclic activation signals of an appropriate temporal character as have been extensively in use in the motor vehicle industry. Furthermore, the setup comprises a Tank Lid Sensor signal T.L.S., and a Fuel Level Sensor signal F.L.S., which signals are applied in such manner that no drive-off is possible with either a loose or absent tank lid, or with an insufficient amount of fuel present. For an engine running on gas, lid 44, sufficiency measurement of fuel supply 40, and fuel pump/valve arrangements 32/36 should be adapted in manners that by themselves are conventional in the art.

Finally, spark generation 28, start engine 24, fuel injection 30, and tank electronics 34 have been provided with blocking signal inputs B1, B2, B3, B4, respectively, allowing to block operativity to either or all of these elements under a condition of unauthorized drive-off. Inasmuch as the key aspect of the present embodiment is to provide an inhibiting mechanism for the fuel supply to the vehicle engine, one or more of blocking facilities B1, B2, B3 could have been omitted. The blocking-unblocking of tank electronics 34 through signal B4 is provided on line 23 through source 21 that will be discussed more in detail hereinafter. As indicated by bidirectional arrows, interconnection 23 can carry a dialog on an applicable level of communication, and can be single- or multiple-wire according to specific design.

Figure 2:
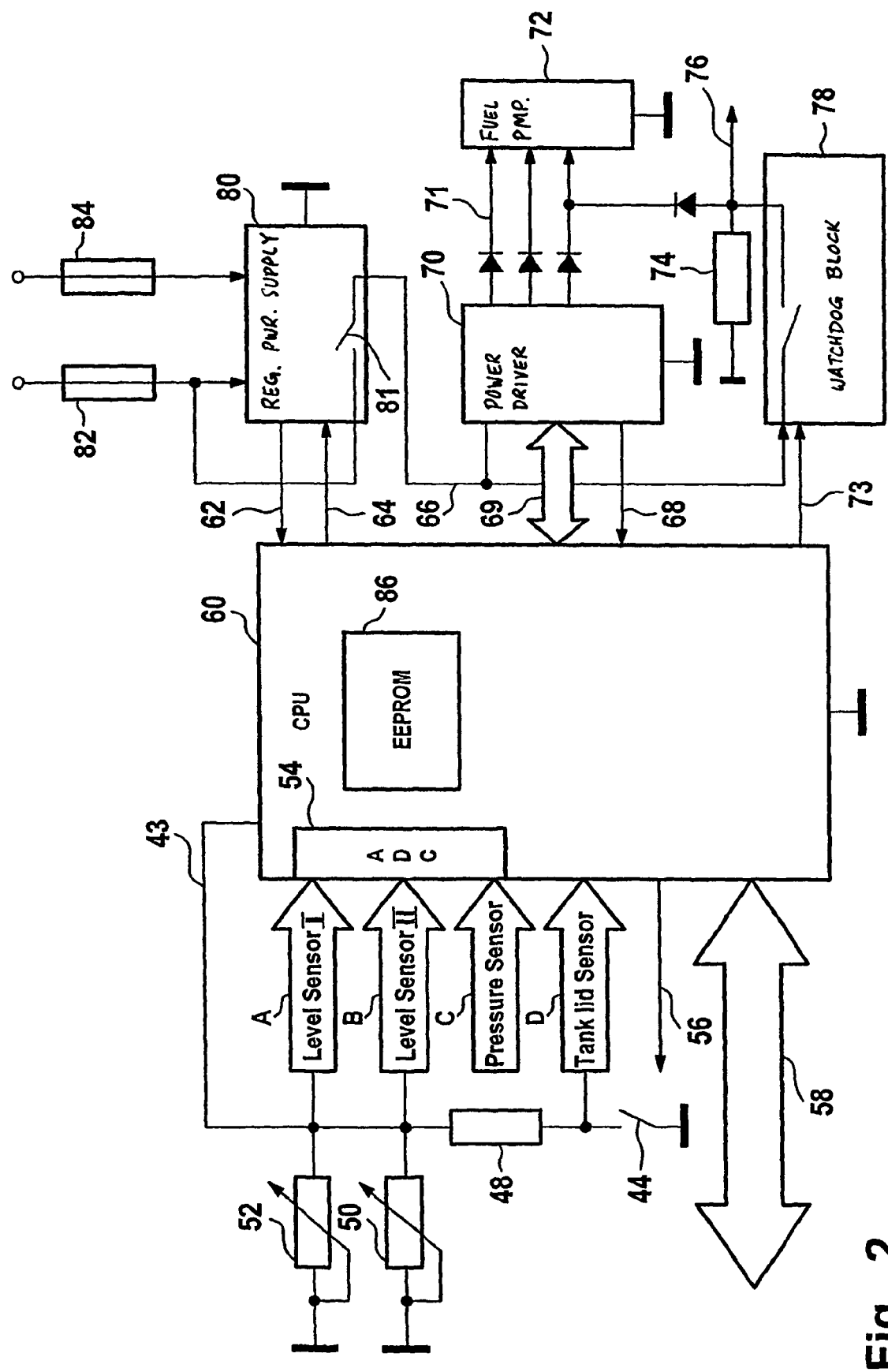
FIG. 2, a more extensive diagram of the key parts of a presently preferred inventive embodiment.

FIG. 2 illustrates a more extensive block diagram of the key parts of an inventive embodiment, as specifically pertaining to the tank/fuel pump electronics that provide drive-off control. A peripheral power supply line 43 from a power supply output terminal of CPU 60 is connected to various elements at the left side of the Figure. At lower left, tank lid contact 44 when opened provides a high voltage to input arrow D. When closed, this input becomes low or grounded through resistor 48. Level sensor potentiometers 50, 52 cause varying input signal values to arrows A, B as indicating fuel levels such as being present in main and reserve, respectively. Arrow C stems from a pressure sensing element not shown further, which may indicate an appropriate pressure value, such as gasoline. Arrows A, B, C are in ADC 54 converted to respective digital values.

CPU 60 is the central element of the arrangement, and may be a special purpose design, or rather, a general purpose specifically programmed microprocessor as has been widely used in the art of digital control. For brevity, the various subsystems thereof have not been presented, inasmuch as microprocessor specifics are not crucial to the present invention. CPU 60 contains an EEPROM 86 for storing various operational characteristics in the shape of digitized curves, the number of past errors associated to the drive-off prevention, and sequencing information for use with engine and possibly other control functions. At top right, terminal #15 (82), provided with a fuse as shown, provides a trigger signal to wake up the arrangement of FIG. 2 from standby. A second terminal 30 (84), also provided with a fuse is arranged for other purposes, such as for receiving unregulated power supply from the vehicle accumulator.

Block 80 is arranged for providing regulated power supply on line 62 to CPU 60. In particular, the power supply is failure-proof against short circuits and self-maintaining. The self-maintaining is activated through line 64 from CPU 60 and will control closing of relay 81. Such power supplies by themselves are conventional. The closing of relay 81 provides powering on line 66 to various further subsystems. When powered, power driver 70 will provide operating power to fuel pump 72, which may be based on an electric motor, such as e.g. a brushless motor, or other convenient facility. Power driver 70 to this effect has been shown with three current leads 71 each provided with a rectifying cell. Furthermore, power driver 70 is internally provided with short circuit detection not shown in detail. Bidirectional multiline arrow 69 communicates a value indicating either a rotary field frequency, or rather a pulse-width modulation quantity, as the case may be, and such being compatible with the nature of fuel pump 72. The communication proper may be subject to a dialog protocol. The target value of pump rotation speed is set by overall engine control such as provided by a driver person and/or cruise control. Line 68 is used to signal actual rotary speed of fuel pump 72 back from power driver 70 to CPU 60, such as being possibly subject to inertial or other delay of fuel pump 72 viz à viz control settings received on line 69.

Figure 3:
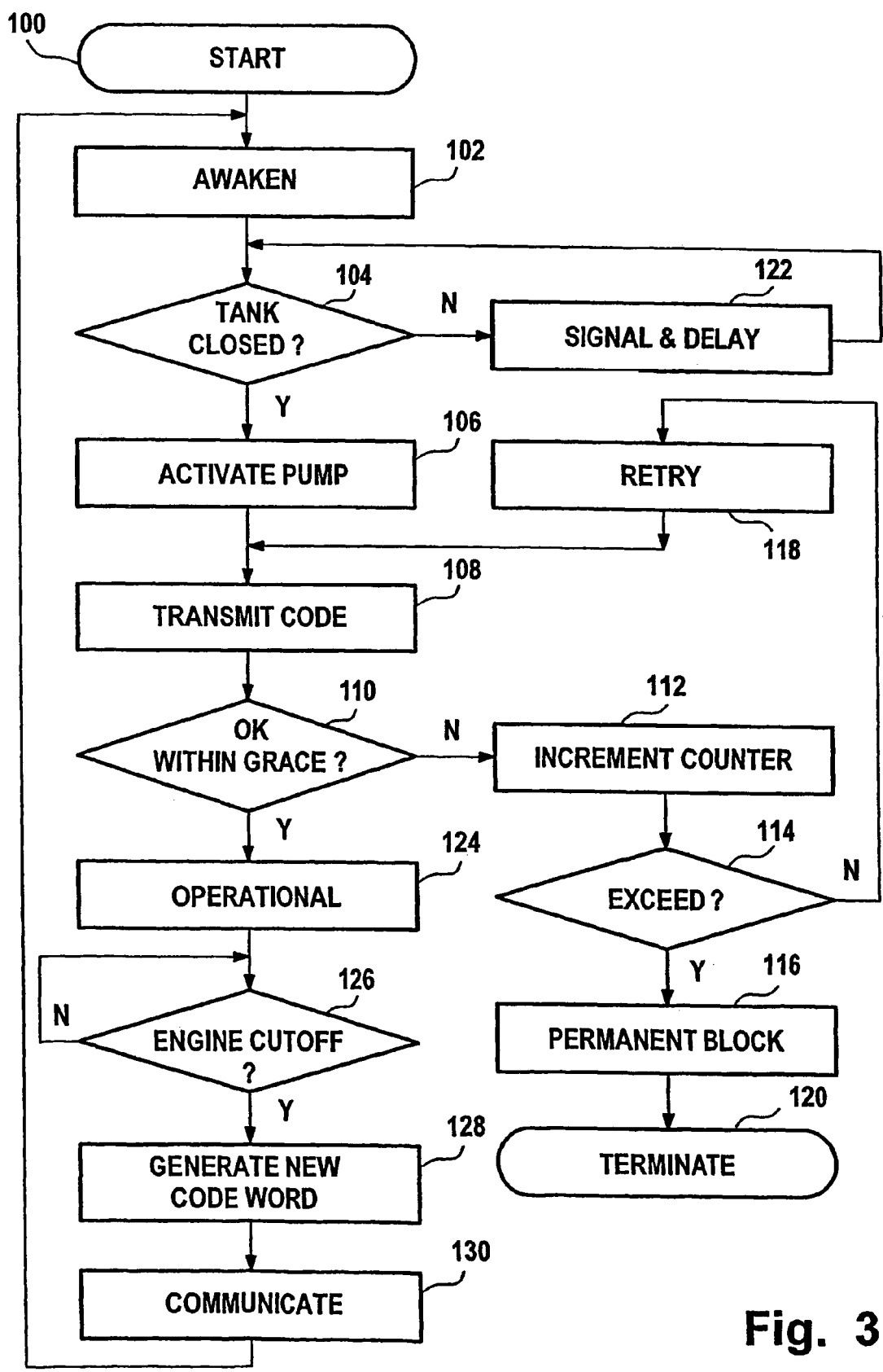
FIG. 3, a flow chart of the preferred embodiment's operation.

Watchdog block 78 receives a watchdog signal from CPU 60 on line 73, as well as power supply from block 80 on line 66. Internally in watchdog block 78, a bridging relay for the power supply signal has been shown. Through resistor 74 and a branch provided with a rectifier cell from one of the lines 71, under appropriate conditions a failure signal 76 carrying error data will be outputted, such as for visual display or other signalization to the vehicle driver. Finally, bidirectional multi-line arrow 58 communicates dialog and diagnosis signals with an operator or other control mechanism, and will furthermore serve for adjusting parameters of the fuel pump system as will be discussed more in detail hereinafter. In particular, this communication may include a specific codeword that has been agreed with an external circuit, and reception of which codeword will then be indispensable in the drive-off prevention security to effectively allow actual drive-off. However, other solutions not expressly using a code word could be feasible as well. Overall functionality of CPU 60 will include the following aspects:

drive-off prevention security inclusive of associated logic
demand dependent fuel pump control
watchdog
fuel level measuring and assessment, such as for calculating the total tank volume in a multiple chamber tank
OBD (On Board Diagnosis) on defects such as e.g. tank leakage
recognizing of tank lid being in place or not
delayed electrical termination of a refueling operation
EE memory for storing characteristics of fuel tank, such as height versus volume
dialoguing, such as through operating a standard and by itself prior art CAN bus protocol that has proved to be convenient for motor vehicles
input/output data of system pressure, given by an appropriate sensor mechanism not shown
requirement data for fuel pump performance
time to prime, as temporal parameters pertinent to dynamic fuel injection and/or spark timing
level values of fuel FIG. 3 illustrates a flow chart of the preferred embodiment's operation. In block 100, the system goes to standby at appropriate initialization under claiming and assigning of the necessary hardware and software facilities. Thus, at the attempted starting of the motor vehicle, the tank electronics (TE) will be in standby mode and will be awakened (block 102) through the asserting of terminal 15. In case the tank lid is signaled (detected in block 104, N) "not closed", the engine will not start, but will signalize so in block 122 and effectively implement a waiting loop. The tank electronics will transmit a pertinent message through the dialog interface (DS) to the combinator or, respectively, information display.

Otherwise (Y in block 104), the fuel pump (KP) will get running immediately (activated in block 106), while motor control will go to check the legitimacy and will transmit the currently valid code word to the Tank Electronics (activated in block 108). The code is associated to the operator in a manner that by itself is state-of-the-art, such as through a reprogrammable key, an external code to be introduced by hand, a combination thereof, or other. If no codeword or an erroneous code word arrives (signaled in block 110), the fuel pump will be cut down after a preset timeout (or grace period) such as two seconds, and the counter value for code faults incremented (this is effected in block 112). The counter value may be optionally reset to zero at three consecutive, properly executed engine start operations. The attaining of a preset maximum value for the number of unauthorized start attempts will be detected in block 114 and/or the running-out of a grace period, will in block 116 set a permanent failure bit in the EEPROM. This bit value will subsequently immediately abort all further start attempts in block 120. The failure bit can only be reset when the tank electronics have been dismantled from the motor vehicle, followed by a new Initial Reset. This Initial Reset will thereupon effect that the next received deactivating code will be received and processed. Subsequently, the tank electronics will set the subsequent deactivating codes. All unsuccessful attempts will be counted in the EEPROM for being taken into account. If the check of the code word is repeated through a retry in block 118, and gets positive before the end of the above grace period, such as in a second or further attempt, the tank electronics will ignore any possible code fault and let the fuel pump go on. This procedure minimizes the starting time or time-to-prime in the normal situation, while allowing for a temporary or accidental transmission of an erroneous code.

This success (Y in block 110) will then trigger a selfholding of terminal 15 through the voltage regulator, which selfholding may only be terminated through disappearance of the signal on terminal 15. This guarantees that in case of (temporary) hardware or software errors the power supply remains assured for the fuel pump, and that the intended operation of the vehicle may continue in block 124.

During standard operation after the start of the motor vehicle, the electronics will control the fuel pump through pulse width modulation in case of a DC motor. In case of an electrical brushless motor, the control is effected through the rotary field. This allows assessing of the pressure produced by the fuel pump with the pressure sensor. The target value therefor may be specified through the dialog interface, and the actual value is used as a control value. The actual value may again be communicated through the interface. In case of control jumps, the CPU may signal an advance message, to minimize the dead time of the system. This additional control facility will manage or improve hot starts, that generally will briefly need a raised pressure.

Simultaneously, the CPU will continually output a pulse train to the watchdog. If these are interrupted through a software or hardware failure, the watchdog will switch the fuel pump permanently and self-holding onto terminal 15 for a DC motor only. Effectively, this represents an unregulated emergency, which separately sets an error bit, meaning a high-low signal change.

The level signals received are accounted via a characteristic curve field, and will as an overall result be communicated through the dialog interface to the combination. In the ideal case, the fuel tank level provides a linear curve from 0% to 100%. In the combination instrument only one parameter needs to be communicated, that is, how many liters correspond to 100%. This decouples the indication system from the fuel tank characteristic.

The tank electronics will recognize the cutoff of the engine through the switching down of terminal 15 as indicated by the Y output of block 126. Otherwise, this block 126 effectively operates as a waiting loop (output N). This cutoff will switch off the fuel pump (not shown in the diagram). Next, the CPU will in block 128 generate a new dynamic code word for the drive-off prevention. This is communicated to the MSE in block 130, which may be located in the driver person's key, or be memorized in another manner, and acknowledged electronically. Thereupon, the system may proceed to standby, as corresponding to block 102, supra. If, on the other hand, the system was running in emergency mode, then upon engine cutoff the self-holding relay 81 will open, inasmuch as it was held closed through terminal 15, the latter in fact holding the relay closed. Thereafter, the tank electronics will go back to standby (for being eventually awakened again in block 102). Because of the emergency drive facility of the fuel pump, the fuel system must be provided with a mechanical pressure regulator, which has a pressure above the controlled pressure.

Generally, the flow chart of FIG. 3 has left out several aspects of the invention that were discussed supra, such as the re-initializing procedure, the running in the emergency state, and the measuring of the system pressure. All of these would be clear to the skilled art practitioner however, in view of the other discussions presented supra.

Now, the present invention has here above been fully disclosed with reference to preferred embodiments. However, persons skilled in the art will readily recognize various changes and amendments thereto. In view of this, unless such changes or amendments will fall outside the scope of the accompanying Claims, they shall be construed as forming fully part of the present invention.

What is claimed is:

1. An apparatus arranged for providing drive-off security in a motor vehicle environment through blocking one or more vehicle engine system subfunctions, said apparatus comprising:
   a detection circuit detecting an unauthorized system activation;
   an on-off control circuit pertaining to and controlling a fuel pump arrangement functionality means, said on-off control circuit being configured to electronically start the fuel pump arrangement at an attempted starting of the motor vehicle and being triggered to electronically switch off the fuel pump after the attempted starting when said detection circuit detects that the attempted starting was unauthorized;
   wherein said detection circuit is disposed between the on-off control circuit and the fuel pump arrangement functionality means, wherein said detection circuit determines whether a pre-established code word is received from a drive-off security electronic circuit, said on-off control circuit being triggered to electronically switch off the fuel pump arrangement functionality means if no code word or an erroneous code word is received.

2. The apparatus as claimed in claim 1, wherein said on-off control circuit is physically arranged in an immediate vicinity of a fuel tank of the motor vehicle.

3. The apparatus as claimed in claim 1, wherein said on-off control circuit is physically integrated with one of a fuel tank or a fuel pump element of the motor vehicle.

4. The apparatus as claimed in claim 1, wherein said drive-off security circuit further encompasses at least one of start means inhibition, spark means inhibition, and fuel injection means inhibition facilities.

5. A motor vehicle comprising an apparatus arranged for providing drive-off security through blocking one or more vehicle engine system subfunctions, said apparatus comprising:
   a detection circuit detecting an unauthorized system activation;
   an on-off control circuit pertaining to and controlling a fuel pump arrangement functionality means, said on-off control circuit being configured to electronically start the fuel pump arrangement at an attempted starting of the motor vehicle and being triggered to electronically switch off the fuel pump after the attempted starting when said detection circuit detects that the attempted starting was unauthorized;
   wherein said detection circuit is disposed between the on-off control circuit and the fuel pump arrangement functionality means, wherein said detection circuit determines whether a pre-established code word is received from a drive-off security electronic circuit, said on-off control circuit being triggered to electronically switch off the fuel pump arrangement functionality means if no code word or an erroneous code word is received.

6. The apparatus as claimed in claim 1, wherein said detection circuit includes a central processing unit having an EEPROM for storing operational characteristics.

7. The apparatus as claimed in claim 6, wherein the operational characteristics comprise at least one of digitized curves, a number of past errors associated with drive-off prevention and sequencing information for engine and control functions.

8. The apparatus as claimed in claim 1, wherein the detection circuit includes a watchdog block which receives a watchdog signal from a central processing unit of the detection circuit, the watch dog block outputting a failure signal for visual display or signaling purposes.

9. The motor vehicle as claimed in claim 5, wherein the detection circuit includes a central processing unit having an EEPROM for storing operational characteristics.

10. The motor vehicle as claimed in claim 9, wherein the operational characteristics comprise at least one of digitized curves, a number of past errors associated with drive-off prevention and sequencing information for engine and control functions.

11. The motor vehicle as claimed in claim 5, wherein the detection circuit includes a watchdog block which receives a watchdog signal from a central processing unit of the detection circuit, the watch dog block outputting a failure signal for visual display or signaling purposes.

12. The apparatus as claimed in claim 1, wherein at least the on-off control circuit and the detection circuit comprise part of tank electronics physically joined with the fuel pump as a subassembly.

13. The motor vehicle as claimed in claim 5, wherein at least the on-off control circuit and the detection circuit comprise part of tank electronics physically joined with the fuel pump as a subassembly.

* * * * *